April 8, 1941.                 C. J. DALLEY                2,238,014
                              SHEARS AND THE LIKE
                              Filed Nov. 16, 1939
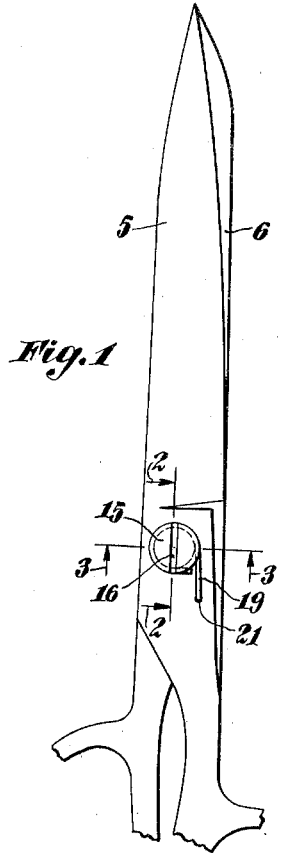
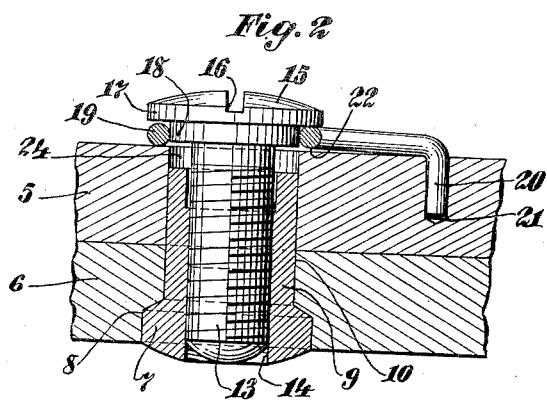
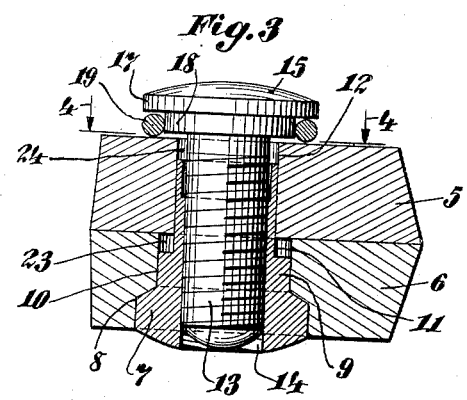
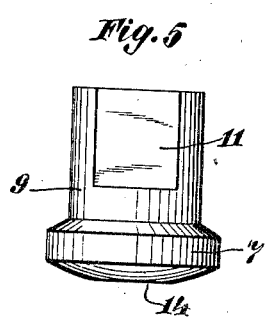
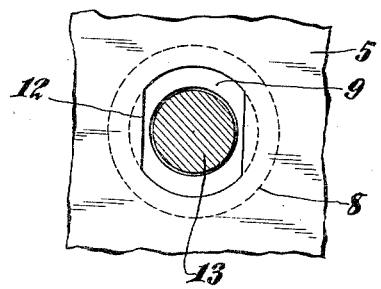
INVENTOR.
Charles J. Dalley,
BY
ATTORNEY.

Patented Apr. 8, 1941

2,238,014

UNITED STATES PATENT OFFICE 2,238,014

SHEARS AND THE LIKE

Charles J. Dalley, Maplewood, N. J., assignor to The W. H. Compton Shear Company, Newark, N. J., a corporation of New Jersey Application November 16, 1939, Serial No. 304,694

2 Claims. (Cl. 151—33)

The invention here disclosed relates to shears and the like, and particularly to connecting and tension regulating means on the order of that covered in the C. J. Dalley Patent 2,108,654, Feb. 15, 1938, Reissue No. 21,517, July 30, 1940.

Special objects of the present invention are to provide a simple substantial form of connection for the blades or other associated relatively swinging members furnishing ample bearing surface for the pivoting movements and which may be readily regulated to place said members under a desired tension and which when so adjusted will maintain the members at such tension.

Further objects are to provide connecting and tension regulating means having the attributes mentioned, which will consist of but few, sturdy, inexpensive parts, readily manufactured and easily assembled.

The foregoing and other desirable objects are attained in the present invention by novel features of construction, combinations and relations of parts, all as hereinafter described, illustrated in the accompanying drawing and broadly covered in the claims.

Fig. 1 is a plan view of a shears having the invention incorporated therein.

Fig. 2 is an enlarged broken cross-sectional view on substantially the plane of line 2—2 of Fig. 1.

Fig. 3 is a similar view as on line 3—3 of Fig. 1; Fig. 4 is a broken sectional view as on line 4—4 Fig. 3 and Fig. 5 is a detached view of the bearing nut.

In the illustration, the pivotally associated members, which in this instance, take the form of shear blades are designated 5 and 6.

The pivotal connection is provided by screw elements in the form of a nut which extends through both members, slidingly keyed in one and providing a bearing for the other, and in a bolt which draws the nut into the member in which it is keyed.

As shown in the sectional views the nut element has a circular head flange 7, which seats into a circular recess 8, in blade 6, a cylindrical portion 9, back of such head entered in the cylindrical portion 10, of blade 6, and a non-circular inner end portion 11, slidingly keyed into a correspondingly non-circular opening 12, through blade 5.

The bolt element consists of a relatively long screw shank 13, engaged in the elongated screw passage 14, of the nut, a head 15, slotted at 16, or otherwise shaped for engagement by a screw driver or other adjusting tool, and beneath the rim or flange 17, of such head, a reduced substantially cylindrical portion 18.

Surrounding the substantially cylindrical shoulder under the head of the bolt is a coil 19, of spring wire. This wire is shown anchored against turning by having the angularly bent end 20, of the same entered in a recess 21, in the face of blade 5.

The loop 19, of the spring wire clip is of slightly smaller inside diameter than the diameter of the substantially circular portion of the bolt, thus requiring this portion of the bolt to spring the loop slightly open to enter the same and so effect yielding frictional engagement between the anchored clip and bolt.

Instead of being formed in a single flat plane, the spring wire clip may be bent or twisted substantially as indicated at 22, so that the head flange of the bolt will have a flattening down effect, causing the loop to interpose a certain amount of spring tension between the bolt head and adjoining blade. The clip is shown made of wire circular in cross-section, providing rounded or bevelled entrance surfaces for the substantially cylindrical portion of the bolt to enter for effecting the necessary spreading of the loop. Also, this diameter of the wire may be equal to or even slightly in excess of the depth of the substantially cylindrical shoulder 18, so that the loop will be firmly gripped and held between the flange of the head and opposing surface of the blade.

While the grip of the encircling spring loop on the substantially cylindrical portion of the bolt head is usually sufficient, the contacting surfaces, if desired, may be roughened or otherwise treated to increase the holding effect or accomplish an interlocking engagement between such parts. The loop is shown faced with the open end of the same in the unscrewing direction, so that any tendency of the bolt to unscrew is opposed by the wrapping action of the loop about the cylindrical portion of the bolt.

By constructing the parts as shown, that is, with the pivot bearing for the blade on the nut element of the screw connection, a large diameter bearing surface is provided, which may be substantially the full thickness of the blade. The circular flange 7, at the outer end of the nut affords additional pivot bearing surface and an extended flat bearing surface for confining this to the other blade. In this construction, also the nut has a keyed sliding engagement in the blade at the inner end of the same which may be substantially the full thickness of that blade. Thus the nut can be very firmly held in the blade to which it is anchored. Because of the permissible length of the bolt, that is, substantially that of the elongated nut and hence practically the complete thickness of the two blades, a relatively small diameter screw shank can be employed. The length of this screw connection also is an aid in the retention of the parts in adjusted relation. By clamping between the head of the bolt and adjacent face of the blade the spring loop is further gripped, in addition to the grip effected between the loop and the slightly larger size circular portion of the bolt. The circular cross-sectional shape of the wire which forms the loop of normally slightly less diameter than the circular portion of the bolt enables smooth easy expansion of the loop by the circular shoulder of the bolt head.

Small clearances are indicated at 23, 24, between the inner end of the circular bearing portion 23, and adjacent surface of the inner blade and between the end of the flat sided inner portion of the nut and head of the bolt, permitting full adjustments to be made without the nut stopping against the face of the blade in which it is slidingly keyed and without the nut being stopped against the face of the bolt head.

What is claimed is:

1. A blade tensioning pivotal connection for shears and the like, comprising in combination, companion blade members, a bolt and an engaged nut pivotally connecting said members in coacting relation, said nut having a shank extending nearly all the way through both members but terminating at a point leaving clearance for adjustment purposes at the inner end of the nut, said nut having a circular portion at the outer end of the same of larger diameter than the shank and forming a bearing for one member, said nut having a non-circular portion at the inner end, said other member having a uniform opening of non-circular cross section corresponding to said inner end portion of said nut and receiving said inner end portion of the nut in free sliding engagement for blade tensioning purposes, said bolt having a screw stem entered through the inner end of said nut and a larger diameter head for confining said other blade member, said bolt head having a large diameter annular shoulder at the inner face of the same, a loop of spring wire of circular cross section encircling and yieldingly gripping said annular shoulder and means for securing one end of said spring wire loop in non-rotative engagement on said other blade member and said bolt head having means for enabling rotative adjustment of the same to effect free sliding adjustments of the nut in said other member and whereby said bolt will be yieldingly retained in the various positions to which it may be turned for blade tensioning purposes.

2. The invention as expressed in claim 1 and wherein said bolt gripping loop of spring wire is bowed out of a flat plane so as to act as a spring under flattening pressure and said bolt head has a portion overstanding said bowed spring wire loop for applying flattening pressure and thereby variably spring tensioning the blade members in accordance with adjustment of the bolt in the nut.

CHARLES J. DALLEY.